United States Patent [19]

Miale et al.

[11] 4,253,877

[45] Mar. 3, 1981

[54] ANTI-FOULING MARINE PAINTS CONTAINING MICROENCAPSULATED ANTI-FOULING AGENTS AND THE PROCESS OF MICROENCAPSULATION

[75] Inventors: John B. Miale, Coconut Grove; August Miale, Jr., Key Biscayne; Raymond P. Porter, Miami, all of Fla.

[73] Assignee: University of Miami, Coral Gables, Fla.

[21] Appl. No.: 62,985

[22] Filed: Aug. 2, 1979

[51] Int. Cl.$^3$ ................................................ C09D 5/16
[52] U.S. Cl. .................................. 106/18.35; 106/16; 106/129; 106/208; 252/316; 424/288
[58] Field of Search .................. 106/15.05, 18.35, 129, 106/208; 252/316; 424/288

[56] References Cited

U.S. PATENT DOCUMENTS

| Re. 28,779 | 4/1976 | Katayama et al. | 428/307 |
|---|---|---|---|
| 2,730,456 | 1/1956 | Green et al. | 521/55 |
| 2,730,457 | 1/1956 | Green et al. | 428/307 |
| 2,800,457 | 7/1957 | Green et al. | 106/19 |
| 2,970,923 | 2/1961 | Sparmann | 106/16 |
| 3,639,583 | 2/1972 | Cardarelli et al. | 424/288 |
| 3,725,089 | 4/1973 | Zola | 106/15.05 |
| 3,956,172 | 5/1976 | Saeki et al. | 428/307 |
| 4,139,515 | 2/1979 | Dennington | 260/29.6 MM |
| 4,143,015 | 3/1979 | Soeterik | 106/15.05 |
| 4,152,784 | 5/1979 | McGalliard | 2/239 |
| 4,155,741 | 5/1979 | Scher et al. | 71/65 |
| 4,157,999 | 6/1979 | Matsuda et al. | 260/42.21 |
| 4,162,165 | 7/1979 | Schwab | 106/21 |
| 4,166,152 | 8/1979 | Baker et al. | 428/522 |
| 4,166,800 | 9/1979 | Fong | 252/316 |

FOREIGN PATENT DOCUMENTS 2155166  5/1973  France .

OTHER PUBLICATIONS

Bungebern, de J., *Coll. Science*, vol. II, pp. 339-341, 1949.

*Primary Examiner*—Lorenzo B. Hayes
*Attorney, Agent, or Firm*—Mary Helen Sears; James R. Laramie

[57] ABSTRACT

A process for microencapsulating water-immiscible chemicals is disclosed which comprises mixing a colloidal solution of gelatin Type A and gum acacia with an emulsion or slurry of the water-immiscible chemical, both of which are prepared and mixed at a temperature above about 50° C., and allowing the mixture to cool so that the droplets or particles of water-immiscible chemical are encapsulated with a macromolecular membrane of a complex coacervate of gelatin and gum acacia. Anti-fouling marine paints capable of sustained release of anti-fouling agent are prepared by adding microcapsules of anti-fouling agents to a marine paint vehicle.

14 Claims, No Drawings

ANTI-FOULING MARINE PAINTS CONTAINING MICROENCAPSULATED ANTI-FOULING AGENTS AND THE PROCESS OF MICROENCAPSULATION

BACKGROUND OF THE INVENTION

1. Field of the Invention

This invention relates to microcapsules containing water-immiscible biocidal substances, to the methods for preparing such microcapsules, and to extended-life, anti-fouling marine paints containing such microcapsules.

2. Description of the Prior Art

Prior to the present invention, numerous anti-fouling marine paints were developed in which effective anti-fouling agents were incorporated into suitable marine paint bases. These paints were then applied to underwater surfaces in an effort to limit the growth of marine organisms. Prior art anti-fouling marine paint compositions of this type are disclosed, for example, in U.S. Pat. Nos. 2,970,923, 4,139,515 and 4,143,015. U.S. Pat. No. 2,970,923 discloses an anti-fouling marine paint composition containing varnish, pigment and triphenyl tin chloride as anti-fouling agent. The triphenyl tin chloride is uniformly dispersed throughout the paint vehicle. U.S. Pat. No. 4,139,515 discloses an anti-fouling paint for ship hulls which comprises an emulsion of a film-forming emulsion copolymer containing a triorganotin salt of an olefinically unsaturated carboxylic acid, and a substantially water-insoluble metalliferous pigment capable of reacting with seawater to form a water-soluble metal compound. As the paint dissolves, triorganotin ions are released into the seawater and act as biocides. U.S. Pat. No. 4,143,015 discloses an anti-fouling paint comprising a toxicant dispersed in an aqueous solution of vinyl acetate resin. Cuprous oxide and organotin compounds are suggested as suitable toxicants.

In the use of all such prior art anti-fouling marine paints, a coating of the paint is applied to the surface to be protected from fouling growth. As the coating dissolves or is worn down, the biocidal anti-fouling agents leach out of the surface in concentrations lethal to the marine organisms. After a period of time, the paint is no longer effective because the concentration of anti-fouling agent leaching from the surface falls below that which is lethal. This can occur when the paint has dissolved or when additional anti-fouling agent dispersed in the paint below the surface thereof does not leach out and contact the marine organisms.

Thus, it has been a goal of the prior art work on anti-fouling marine paints to control the rates of dissolution of the paint and leaching of the biocide in order to prolong the useful life of the paint. The economic importance of prolonging the effectiveness of anti-foulants is summarized in a recent report sponsored by the U.S. Navy (Ad Hoc Fouling, Biodeterioration Committee, Survey Report: Navy Biological Fouling and Deterioration, Report NUC TP 456, March, 1975). This report states that anti-fouling ship bottom coatings in use are effective for a maximum of 18 months, the cruising range of ships of all sizes is reduced by the increased drag of hull fouling, and fuel consumption increases markedly after only seven months immersion due to partial bottom fouling. It is estimated that the indirect cost to the U.S. Navy attributable to bottom fouling is an additional 80 million dollars per year in fuel utilization. In the Mediterranean, engine cooling-intakes can become completely clogged after only one or two months of submergence and rapid fouling of the water intakes of ships' power plants accounts for costly shut-downs. The report notes that the major reason for expensive dry-docking is to scrape away the fouling organisms and to replenish the anti-fouling coating. For Navy vessels alone this direct cost is over 15 million dollars per year. In addition, marine pilings deteriorate due to fouling and the Navy spends over 200 million dollars per year to replace biologically deteriorated and structurally weakened pilings.

In tropical waters the most important biologic foulant is the barnacle (Janes GA: Problems in Testing Long Term Antifoulants, in: Proceedings of the 1976 Controlled Release Pesticide Symposium, Cardarelli NF, Editor, Engineering and Science Division, Community and Technical College, The University of Akron, Ohio). Other noxious marine surface fouling organisms are: encrusting bryozoa, tunicates, Bugula, hydroids, oysters, tube worms and algae.

As indicated above, the present invention relates to methods of microencapsulating biocidal substances. The classic method for encapsulation of oils is disclosed in Bungenbern de J, Colloid Science, Vol. II, pp. 339, 341, Elsevier Publishing Co. (H. R. Kruyt ed. 1949) and in U.S. Pat. Nos. 2,730,456 and 2,730,457. According to the patents, gum arabic is first dissolved in water. Then the oil to be encapsulated is emulsified into the gum arabic solution until the drop size of the oil is 2–5 microns. An aqueous solution of gelatin is then mixed with the emulsion. All of these steps are conducted at about 50° C. The gelatin-gum arabic colloid is then coacervated either by the addition of cold water or by lowering the pH by the addition of acid. Finally, the capsules are hardened by adding formaldehyde.

Additional complex coacervation processes for the encapsulation of liquids which are representative of the state of the art include U.S. Pat. Nos. 2,800,457, 3,956,172 and Re 28,779. Each of these prior art processes is similar to the classic method described above in which coacervation can be achieved by either lowering the pH or adding water.

SUMMARY OF THE INVENTION

In accordance with the present invention, microcapsules of water-immiscible liquid or solid chemicals can be prepared in which the chemicals are encapsulated with a macromolecular membrane of a complex coacervate of gelatin Type A and gum acacia. The present microencapsulation process comprises preparing at an elevated temperature a colloidal solution containing gelatin Type A, gum acacia and water and then preparing an emulsion or a slurry containing the chemical to be microencapsulated, a powdered inorganic substance, if the chemical is a liquid, and water. The emulsion or slurry of dispersed chemical is then poured into the colloidal solution of gelatin and gum acacia under constant gentle stirring and allowed to cool slowly to room temperature. During the cooling step, the dispersed chemical is encapsulated by the complex coacervate. After cooling the mixture further at low temperatures, the sedimented microcapsules are washed and then resuspended in water. Cold glutaraldehyde solution is then added to cross-link and stabilize the walls of the microcapsules. The microcapsules are washed and then dried.

Anti-fouling marine paints having an extended life are prepared in accordance with the present invention by adding dry microcapsules containing an anti-fouling biocidal substance made according to the present microencapsulation process to a marine paint. Such microcapsules slowly release anti-fouling agent from the surface of the paint and prolong the anti-fouling effect. Microcapsules of other water-immiscible fungicidal, bacteriocidal or other biocidal chemicals can be prepared in accordance with the present process and then added to coating compositions for use in applications in which the controlled release of such chemicals is desirable.

DESCRIPTION OF THE PREFERRED EMBODIMENTS

In accordance with the present microencapsulation process, liquid or solid chemicals can be encapsulated with a macromolecular membrane of a complex coacervate of gelatin Type A and gum acacia. First, a colloidal solution of gelatin and gum acacia is prepared by mixing from about 0.9 to about 1.1 parts by weight of gelatin Type A, from about 0.9 to about 1.1 parts by weight of gum acacia, and from about 45 to about 47 parts by weight of water with constant stirring at a temperature in the range of about 55° C. to about 60° C. Whenever water is employed in the present process, it is preferably distilled water.

If the chemical to be microencapsulated is a water-immiscible liquid, an emulsion of the chemical is prepared by mixing from about 3.9 to about 4.1 parts by volume of the chemical, from about 7.6 to about 7.9 parts by volume of water, and from about 0.1 to about 10 percent by weight of a suitable emulsifier, such as a finely divided inorganic substance based on the combined weight of the water-immiscible liquid and the water. Suitable finely divided inorganic substances include silica, such as Cab-O-Sil, bentonite and the like. Depending upon the degree of ease with which the water-immiscible chemical is emulsified in water, the finely divided inorganic substance is first mixed either with the water-immiscible liquid or with the water before mixture with the other. Those finely divided substances permit the production of microcapsules of controlled and uniform size. The chemical is then dispersed in the aqueous phase using an homogenizer until the dispersed droplets of the chemical to be encapsulated are of the desired size. During the emulsification the mixture is maintained at an elevated temperature. If the chemical to be encapsulated is a finely-divided water-immiscible solid, a slurry of the chemical is prepared by adding from about 0.9 to about 1.1 parts by weight of the chemical to about 4 to about 5 parts by weight of water and a dispersing agent, e.g., Tween 20, about 0.01 part by weight, if necessary. No emulsifying agent is required. This mixture is then stirred gently to form a slurry.

With both the colloidal solution of gelatin Type A and gum acacia and the emulsion or slurry of dispersed chemical to be encapsulated at a temperature of above about 50° C. and preferably in the range of about 55° C. to about 60° C. the emulsion or slurry is then poured into the colloidal solution, and at a pH of about 4.5 is allowed to cool slowly to room temperature with constant stirring. During this cooling step, the droplets or particles of chemical are encapsulated by the coalescing complex coacervate. The ratio of emulsion or slurry to colloidal solution can be varied over a wide range to achieve the desired wall thickness of the macromolecular membrane of the complex coacervate. A ratio of about 1 part by volume of emulsion or slurry to about 4 parts by volume of colloidal solution has been found to be suitable for the preparation of microcapsules for use in anti-fouling marine paints.

If the liquid or finely divided solid chemical hydrolyzes to produce the desired acidity of pH 4.5 the encapsulation proceeds without addition of acid. An example of a self pH shifting chemical is tributyltin chloride. However, with a water-immiscible solid such as tributyltin fluoride the gelatin-gum acacia colloid must be slowly acidified to pH 4.5 with an acid, e.g. HCl, for the coacervate to form at lower temperatures.

The mixture is then allowed to cool so that the droplets or particles of water-immiscible chemical are encapsulated by coalescing complex coacervate. The temperature of the mixture is further lowered and held at about 4° C. to about 10° C. Sedimented microcapsules are then washed several times in about five times their volume of cold distilled water, preferably at a temperature in the range of about 4° C. to about 10° C., to remove the excess complex coacervate not used in the encapsulation of the water-immiscible chemical. Following the final wash, the sedimented microcapsules are resuspended in cold distilled water at a volume equal to at least about that in which the complex coacervation occurred.

A cold solution of a mono- or polyvalent cross-linking or fixing agent, such as glutaraldehyde, formaldehyde or tannic acid, is then added to a final concentration of from about 1 to about 2 percent by volume to cross-link and stabilize the walls of the cold microcapsules. During this fixation step the mixture is stirred for at least about 15–30 minutes at a temperature of about 4° C. to about 10° C. and then held for at least about 4 hours at that temperature. The wet microcapsules are washed and then separated from the water by sedimentation and dried, for example, by lyophilization.

This process has been found to be particularly advantageous for the microencapsulation of biocidal anti-fouling agents. Tributyltin chloride, a water-immiscible liquid, and tributyltin fluoride, a water-immiscible solid, have been found to be particularly acceptable as ship bottom ant-fouling agents. Microcapsules containing anti-fouling agent can be added to marine paints that do not contain any other anti-fouling agent, or they can be added to marine paint specifically formulated to contain an anti-fouling agent. Any good quality ship bottom paint, such as U.S. Navy Formula #1020A base paint which is widely used in the trade, can be employed as the marine paint in accordance with the present invention. Microcapsules of two or more types of anti-fouling agents can be added to the paint when it is to be used to combat specific combinations of marine foulants. Because the anti-fouling agents are microencapsulated, the marine paint can be loaded with a higher concentration than when the biocide as a liquid is formulated directly in the paint. Microcapsules of anti-fouling agent prepared according to the present invention can be mixed with a base paint vehicle in amounts up to about 50 percent by weight of the total paint composition.

It was found that when microcapsules of anti-fouling agent prepared according to the present process were added to conventional marine paint vehicles, for example, Vinyl Rosin Formula 3723-21 (M & T Chemicals Inc.), the agent was released slowly to the surface of the paint and the effectiveness against growth of marine foulants on the surface was significantly prolonged. By means of this controlled release of anti-fouling agent a concentration of the biocide in immersed, painted test panels was sustained at a 100% anti-fouling rating for a period of over 20 months.

By encapsulating fungicidal, bacteriocidal or biocidal chemicals in accordance with the present invention, microcapsules of chemical will be obtained which can be added to conventional paint of other coating vehicles for use in applications where a sustained release of the bioactive chemical is desired.

A more complete appreciation of the invention will be realized by reference to the following specific examples which relate to specific microencapsulation methods and compositions containing microcapsules within the scope of the invention. The following examples are not intended to limit the invention disclosed herein except to the extent that limitations are specifically stated or to the extent to which limitations appear in the appended claims.

EXAMPLE 1

The liquid anti-fouling agent tributyltin chloride was microencapsulated with a thin-walled macromolecular coacervate of gelatin and gum acacia, stabilized and dried in accordance with the present invention. In a first container 10 grams of gelatin Type A (USP), 10 grams of gum acacia (USP), and 460 ml. of distilled water were mixed and heated to 55° C., with constant stirring for at least 1 hour. In a second container 40 ml. of tributyltin chloride (M & T Chemical Co.) was added to 75 ml. of distilled water containing 0.25 gram of Cab-O-Sil that had been sonicated to reduce any agglomerates of this extremely fine inorganic substance to its smallest size. The tributyltin chloride was dispersed in the aqueous phase using a Virtis (Virtis Co.) or Polytron (Brinkman Instruments) homogenizer. During the emulsification the mixture was maintained at about 55° C. to about 60° C. until the dispersed oil droplets were of the desired size (10–30 μm in diameter). With both components at about 55° C., about 115 ml. of the tributyltin chloride dispersed in water was poured into about 460 ml. of the colloidal solution of gelatin and gum acacia and with constant gentle stirring was allowed to cool to room temperature. During the cooling step the droplets of tributyltin chloride were encapsulated by the complex coacervate. The temperature of the mixture was then further lowered and held at 4° C. to 10° C. over night. The sedimented microcapsules were then washed four times in five times the volume of cold distilled water. After the final wash the sedimented microcapsules were resuspended in cold distilled water to the original volume in which the complex coacervation took place. 17 ml. of a 50% solution of cold glutaraldehyde was added to a final concentration of 1.5% to cross-link and stabilize the wall of the capsules. This mixture was stirred for about 15 minutes at 4° C. and then held without stirring for about 12 hours at 4° C. The microcapsules, ranging in size from 10–30 μm, were washed with tap water at room temperature to remove the fixative, and dried by lyophilization. The dried microcapsules were then ready to be added to any suitable ship bottom paint or stored at room temperature in a covered container for later use.

EXAMPLE 2

The process of Example 1 was modified to encapsulate tributyltin chloride with a thick-walled macromolecular coacervate of gelatin and gum acacia. The process of Example 1 was repeated using finely divided (about 5 to 50 μm size) bentonite (USP) in place of Cab-O-Sil, with the exception that to form the oil-in-water type emulsion the 0.25 gram of bentonite was thoroughly mixed with 40 ml. of tributyltin chloride instead of in the water as in Example 1. This mixture was then mixed with the 75 ml. of distilled water before it was emulsified and added to the colloidal solution of gelatin and gum acacia. The process was in all other respects the same as that described in Example 1. The microcapsules obtained had a diameter of about 50–100 μm. The thick-walled microcapsules release anti-fouling agents at the same slow rate as smaller capsules containing the same anti-foulant.

EXAMPLES 3–16

A first batch of microcapsules of tributyltin chloride having diameters of about 50–100 μm was prepared in accordance with the procedure set forth in Example 2 above using finely divided bentonite (USP). A second batch of microcapsules of tributyltin chloride having diameters of about 10–30 μm was prepared by homogenizing at a higher speed. Following the procedure of Example 1, a third batch of microcapsules of tributyltin chloride having diameters of about 10–30 μm was prepared using finely divided Cab-O-Sil, and a fourth batch of microcapsules of tributyltin chloride having diameters of about 1–10 μm was prepared by emulsifying at a higher speed. On the average, tributyltin chloride comprised about 58 percent by weight of the microcapsules in these batches.

Within two weeks after manufacture, the four batches of microcapsules were mixed in a base marine paint vehicle. The base paint employed was Vinyl Rosin AF Paint 3723-21 (M & T Chemicals, Inc.) which has the composition set forth in Table I below:

TABLE I

| Ingredients | Parts by Wt. |
| --- | --- |
| Red iron oxide | 15.12 |
| Talc | 11.22 |
| Zinc oxide | 7.08 |
| Rosin | 3.73 |
| MIBK | 13.31 |
| Cyclohexanone | 13.00 |
| Xylene | 12.84 |
| Bentone 27 ⎫ Pre-wet | 0.51 |
| Methanol ⎭ | 0.15 |
| VAGH (Union Carbide) | 11.16 |

The microcapsules of tributyltin chloride comprise about 8.2 percent by weight of the paint mixtures. Each of the four paints containing microcapsules was then applied by brush to one side of three sanded 8"×10" fiberglass panels. The three panels were coated respectively with one, two and three coats of one of the four paints with air drying between coats. Each coat had a thickness of about 5 mils. Unless otherwise indicated, the thickness of each coat of paint in all of the Examples herein was approximately 5 mils.

Two control paints were also employed. The first control paint used was the vinyl rosin base paint without microcapsules (Example 15). The second control paint (Example 16) was prepared by mixing microcapsules of an inert, non-antifoulant, high temperature oil (Dow Oil #550, Dow Chemical Co.) with the vinyl rosin base paint at the same concentration as the paints containing tributyltin chloride microcapsules. The microcapsules of Dow oil were prepared in accordance with the procedure of Example 1 above with the exception that no finely divided inorganic emulsifying agent was required. It was also necessary to add hydrochloric acid to adjust the pH of the mixture of emulsion and colloidal solution to about 4.5. A single coat of each of the control paints was applied to one side of a sanded fiberglass panel as described above.

All of the coated panels were then immersed in Biscayne Bay, Dade County, Florida so that the tops of the panels remained 1 to 4 feet below the surface of the water. The test panels were removed at monthly intervals for visual inspection and evaluation and then immediately returned to the sea water environment. The percent overall performance at one month intervals for each of the test panels is set forth in Table II below. This overall performance rating reflects fouling resistance of the panel as a whole taking into account adhesion and durability of the paint as well as the anti-fouling properties, the resistance of the paint to fouling, and the anticorrosive properties applicable to paints intended for use on metal surface. A rating of 100 indicates no fouling and a rating of 0 indicates that the panel was completely fouled.

TABLE II

| Example Number | Finely Divided Inorganic Substance | Number of Coats | Months Immersed | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| 3 | lg. bentonite | 1 | 100 | 100 | 100 | 82 | 70 | 50 | 0 | | | | |
| 4 | lg. bentonite | 2 | 100 | 100 | 100 | 100 | 100 | 100 | 92 | 82 | | 79 | 74 |
| 5 | lg. bentonite | 3 | 100 | 100 | 100 | 100 | 100 | 100 | 100 | 100 | | 100 | 100 |
| 6 | sm. bentonite | 1 | 100 | 100 | 84 | 50 | 30 | 30 | 0 | | | | |
| 7 | sm. bentonite | 2 | 100 | 100 | 100 | 100 | 100 | 100 | 100 | 92 | | 92 | 82 |
| 8 | sm. bentonite | 3 | 100 | 100 | 100 | 100 | 100 | 100 | 100 | 100 | | 100 | 100 |
| 9 | lg. Cab-O-Sil | 1 | 100 | 100 | 90 | 80 | 50 | 40 | 40 | 0 | | | |
| 10 | lg. Cab-O-Sil | 2 | 100 | 100 | 100 | 100 | 100 | 100 | 100 | 100 | | 92 | 92 |
| 11 | lg. Cab-O-Sil | 3 | 100 | 100 | 100 | 100 | 100 | 100 | 100 | 100 | | 100 | 92 |
| 12 | sm. Cab-O-Sil | 1 | 100 | 100 | 100 | 75 | 65 | 30 | 30 | 30 | | 0 | |
| 13 | sm. Cab-O-Sil | 2 | 100 | 100 | 100 | 85 | 60 | 60 | 50 | 50 | | 0 | |
| 14 | sm. Cab-O-Sil | 3 | 100 | 100 | 100 | 100 | 100 | 100 | 100 | 100 | | 100 | 100 |
| 15 | None | 1 | 70 | 25 | 0 | | | | | | | | |
| 16 | None | 1 | 65 | 25 | 0 | | | | | | | | |

| Example Number | Finely Divided Inorganic Substance | Number of Coats | Months Immersed | | | | | | | | | |
|---|---|---|---|---|---|---|---|---|---|---|---|---|
| | | | 12 | 13 | 14 | 15 | 16 | 17 | 18 | 19 | 20 | 21 |
| 3 | lg. bentonite | 1 | | | | | | | | | | |
| 4 | lg. bentonite | 2 | 74 | 60 | 50 | 40 | 40 | 30 | 30 | 30 | 30 | 0 |
| 5 | lg. bentonite | 3 | 100 | 100 | 100 | 93 | 93 | 93 | 91 | 80 | 75 | 65 |
| 6 | sm. bentonite | 1 | | | | | | | | | | |
| 7 | sm. bentonite | 2 | 75 | 75 | 70 | 65 | 55 | 50 | 40 | 40* | 40* | 40* |
| 8 | sm. bentonite | 3 | 100 | 100 | 100 | 100 | 100 | 100 | 90 | 65* | 60* | 20* |
| 9 | lg. Cab-O-Sil | 1 | | | | | | | | | | |
| 10 | lg. Cab-O-Sil | 2 | 92 | 92 | 75 | 65 | 65* | 60* | 50* | 50* | 50* | 30* |
| 11 | lg. Cab-O-Sil | 3 | 92 | 92 | 92 | 92 | 92* | 80* | 75* | 90* | 75* | 75* |
| 12 | sm. Cab-O-Sil | 1 | | | | | | | | | | |
| 13 | sm. Cab-O-Sil | 2 | | | | | | | | | | |
| 14 | sm. Cab-O-Sil | 3 | 90 | 90 | 85 | 90 | 75 | 55 | 50 | 50 | 50 | 50 |
| 15 | None | 1 | | | | | | | | | | |
| 16 | None | 1 | | | | | | | | | | |

*Indicates peeling.

EXAMPLES 17-30

Six marine paint compositions were prepared following the procedures of Examples 3-16 above, with the exception that all of the paint compositions additionally contained 6.9 percent by weight of liquid tributyltin chloride. Fourteen sanded fiberglass panels were coated and immersed in accordance with the procedures of Examples 3-16. The present overall performance at monthly intervals for all of these panels is set forth in Table III below:

TABLE III

| Example Number | Finely Divided Inorganic Substance | Number of Coats | Months Immersed | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| 17 | lg. bentonite | 1 | 100 | 100 | 84 | 50 | 0 | | | | | | |
| 18 | lg. bentonite | 2 | 100 | 100 | 100 | 100 | 100 | 100 | 100 | 100 | | 100 | 100 |
| 19 | lg. bentonite | 3 | 100 | 100 | 100 | 100 | 100 | 100 | 100 | 100 | | 100 | 100 |
| 20 | sm. bentonite | 1 | 100 | 100 | 100 | 100 | 80 | 70 | 70 | 70 | | 60 | 60 |
| 21 | sm. bentonite | 2 | 100 | 100 | 100 | 100 | 100 | 100 | 100 | 100 | | 100 | 85 |
| 22 | sm. bentonite | 3 | 100 | 100 | 100 | 100 | 100 | 100 | 100 | 100 | | 100 | 100 |
| 23 | lg. Cab-O-Sil | 1 | 100 | 100 | 100 | 75 | 45 | 45 | 30 | 0 | | | |
| 24 | lg. Cab-O-Sil | 2 | 100 | 100 | 100 | 100 | 100 | 100 | 100 | 100 | | 100 | 100 |
| 25 | lg. Cab-O-Sil | 3 | 100 | 100 | 100 | 100 | 100 | 100 | 100 | 100 | | 100 | 100 |
| 26 | sm. Cab-O-Sil | 1 | 100 | 100 | 89 | 60 | 60 | 50 | 30 | 0 | | | |
| 27 | sm. Cab-O-Sil | 2 | 100 | 100 | 100 | 100 | 90 | 90 | 90 | 90 | | 90 | 90 |
| 28 | sm. Cab-O-Sil | 3 | 100 | 100 | 100 | 100 | 100 | 100 | 100 | 100 | | 100 | 100 |
| 29 | None | 1 | 100 | 100 | 100 | 100 | 100 | 93 | 93 | 93 | | 93 | 93 |

TABLE III-continued

| Example Number | Finely Divided Inorganic Substance | Number of Coats | Months Immersed | | | | | | | | | |
|---|---|---|---|---|---|---|---|---|---|---|---|---|
| | | | | | | | | | | | | |
| 30 | None | 1 | 100 | 100 | 100 | 100 | 100 | 100 | 91 | 91 | 91 | 86 |

| Example Number | Finely Divided Inorganic Substance | Number of Coats | Months Immersed | | | | | | | | | |
|---|---|---|---|---|---|---|---|---|---|---|---|---|
| | | | 12 | 13 | 14 | 15 | 16 | 17 | 18 | 19 | 20 | 21 |
| 17 | lg. bentonite | 1 | | | | | | | | | | |
| 18 | lg. bentonite | 2 | 100 | 100 | 90 | 80* | 80 | 80 | 65* | 65* | 65* | 65* |
| 19 | lg. bentonite | 3 | 100 | 100 | 100 | 90 | 90 | 90 | 90 | 90 | 90 | 90 |
| 20 | sm. bentonite | 1 | 40 | 30 | 0 | | | | | | | |
| 21 | sm. bentonite | 2 | 85 | 85 | 65 | 30 | 30 | 30 | 30 | 30 | 30 | 30 |
| 22 | sm. bentonite | 3 | 100 | 100 | 100 | 70 | 80* | 60* | 50* | 50 | 50 | 30* |
| 23 | lg. Cab-O-Sil | 1 | | | | | | | | | | |
| 24 | lg. Cab-O-Sil | 2 | 100 | 80 | 65 | 65 | 65 | 65 | 65 | 65 | 60 | 60 |
| 25 | lg. Cab-O-Sil | 3 | 100 | 100 | 100 | 100 | 100 | 100 | 100 | 100 | 85 | 85 |
| 26 | sm. Cab-O-Sil | 1 | | | | | | | | | | |
| 27 | sm. Cab-O-Sil | 2 | 90 | 85 | 85 | 75 | 70 | 60 | 50 | 50 | 50 | 50 |
| 28 | sm. Cab-O-Sil | 3 | 100 | 100 | 93 | 93 | 93 | 93 | 88 | 78 | 70 | 60 |
| 29 | None | 1 | 80 | 80 | 70 | 70 | 70 | 65 | 30 | 30 | 30 | 0 |
| 30 | None | 1 | 81 | 81 | 81 | 81 | 81 | 81 | 76 | 60 | 55 | 55 |

*Indicates peeling.

EXAMPLES 31–44

Six marine paint compositions were prepared in accordance with the procedures set forth in Examples 3-16 above, with the exception that Chlorinated Rubber A/F Paint Formula 1A (3723-24-2) (M & T Chemicals, Inc.) was employed as the base marine paint vehicle instead of the vinyl rosin paint base. The chlorinated rubber paint base has the composition set forth in Table IV below:

TABLE IV

| Ingredients | Parts by Wt. |
|---|---|
| Red iron oxide | 4.50 |
| Zinc oxide | 20.80 |

TABLE IV-continued

| Ingredients | Parts by Wt. |
|---|---|
| Talc | 7.70 |
| Bentone 27 ⎫ Pre-wet | 0.44 |
| Methanol ⎭ | 0.12 |
| Parlon-S-20 | 11.20 |
| Rosin | 5.98 |
| Xylene | 35.14 |

Fourteen panels were coated with the compositions prepared and immersed according to the procedures set forth in Examples 3-16. The percent overall performance at monthly intervals for these panels is set forth in Table V below:

TABLE V

| Example Number | Finely Divided Inorganic Substance | Number of Coats | Months Immersed | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| 31 | lg. bentonite | 1 | 100 | 90 | 90 | 60 | 0 | | | | | | |
| 32 | lg. bentonite | 2 | 100 | 100 | 100 | 100 | 100 | 82 | 82 | 77 | | 77 | 72 |
| 33 | lg. bentonite | 3 | 100 | 100 | 100 | 100 | 100 | 100 | 100 | 100 | | 100 | 100 |
| 34 | sm. bentonite | 1 | 100 | 100 | 85 | 75 | 60 | 55 | 55 | 55 | | 55 | 55 |
| 35 | sm. bentonite | 2 | 100 | 100 | 100 | 91 | 83 | 83 | 83 | 83 | | 83 | 83 |
| 36 | sm. bentonite | 3 | 100 | 100 | 100 | 100 | 94 | 86 | 86 | 86 | | 89 | 89 |
| 37 | lg. Cab-O-Sil | 1 | 100 | 100 | 80 | 65 | 0 | | | | | | |
| 38 | lg. Cab-O-Sil | 2 | 100 | 100 | 100 | 93 | 80 | 75 | 75 | 60 | | 0 | |
| 39 | lg. Cab-O-Sil | 3 | 100 | 100 | 100 | 100 | 90 | 90 | 90 | 80 | | 80* | 80* |
| 40 | sm. Cab-O-Sil | 1 | 100 | 100 | 80 | 60 | 0 | | | | | | |
| 41 | sm. Cab-O-Sil | 2 | 100 | 100 | 100 | 100 | 90 | 90 | 87 | 87 | | 87* | 87* |
| 42 | sm. Cab-O-Sil | 3 | 100 | 100 | 100 | 90 | 90 | 90 | 90 | 90 | | 90* | 90* |
| 43 | None | 1 | 75 | 45 | 0 | | | | | | | | |
| 44 | None | 1 | 75 | 45 | 0 | | | | | | | | |

| Example Number | Finely Divided Inorganic Substance | Number of Coats | Months Immersed | | | | | | | | | |
|---|---|---|---|---|---|---|---|---|---|---|---|---|
| | | | 12 | 13 | 14 | 15 | 16 | 17 | 18 | 19 | 20 | 21 |
| 31 | lg. bentonite | 1 | | | | | | | | | | |
| 32 | lg. bentonite | 2 | 72 | 68 | 63 | 35 | 25 | 0 | | | | |
| 33 | lg. bentonite | 3 | 95* | 90* | 90* | 80* | 80* | 80* | 75* | 75* | 65* | 50* |
| 34 | sm. bentonite | 1 | 50 | 40 | 0 | | | | | | | |
| 35 | sm. bentonite | 2 | 83 | 83* | 83* | 50* | 45* | 20 | 0 | | | |
| 36 | sm. bentonite | 3 | 89 | 85* | 85* | 85* | 85 | 85 | 75 | 70* | 60* | 50* |
| 37 | lg. Cab-O-Sil | 1 | | | | | | | | | | |
| 38 | lg. Cab-O-Sil | 2 | | | | | | | | | | |
| 39 | lg. Cab-O-Sil | 3 | 80* | 80* | 80* | 60* | 55* | 40* | 25* | 25* | 25* | 0 |
| 40 | sm. Cab-O-Sil | 1 | | | | | | | | | | |
| 41 | sm. Cab-O-Sil | 2 | 87* | 70* | 70* | 70* | 67* | 57* | 50* | 50* | 50* | 50* |
| 42 | sm. Cab-O-Sil | 3 | 90* | 80** | 80** | 60* | 60* | 60* | 60* | 60* | 60* | 60* |
| 43 | None | 1 | | | | | | | | | | |
| 44 | None | 1 | | | | | | | | | | |

*Indicates peeling.
**Indicates no fouling.

EXAMPLES 45-58

Six marine paint compositions were prepared following the procedures of Examples 17-30 above, with the exception that chlorinated Rubber A/F Paint Formula 1A (3723-24-2) was used instead of the vinyl rosin paint base. Fourteen fiberglass panels with these compositions and immersed according to the procedures set forth in Examples 3-16 above. The percent overall performance at monthly intervals for these panels is set forth in Table VI below:

TABLE VI

| Example Number | Finely Divided Inorganic Substance | Number of Coats | Months Immersed | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| 45 | lg. bentonite | 1 | 100 | 100 | 86 | 60 | 60 | 40 | 0 | | | | |
| 46 | lg. bentonite | 2 | 100 | 100 | 100 | 100 | 70 | 70 | 70 | 70 | | 70* | 70* |
| 47 | lg. bentonite | 3 | 100 | 100 | 100 | 100 | 100 | 80 | 80 | 80 | | 80* | 80* |
| 48 | sm. bentonite | 1 | 75 | 92 | 50 | 50 | 0 | | | | | | |
| 49 | sm. bentonite | 2 | 100 | 100 | 80 | 50 | 0 | | | | | | |
| 50 | sm. bentonite | 3 | 100 | 100 | 100 | 100 | 100 | 70 | 40 | 30 | | 30* | 30* |
| 51 | lg. Cab-O-Sil | 1 | 100 | 100 | 85 | 50 | 0 | | | | | | |
| 52 | lg. Cab-O-Sil | 2 | 100 | 100 | 100 | 100 | 100 | 100 | 92 | 80* | | 89* | 89* |
| 53 | lg. Cab-O-Sil | 3 | 100 | 100 | 100 | 100 | 100 | 90 | 90 | 85 | | 85 | 85 |
| 54 | sm. Cab-O-Sil | 1 | 100 | 100 | 85 | 70 | 50 | 40 | 0 | | | | |
| 55 | sm. Cab-O-Sil | 2 | 100 | 100 | 100 | 100 | 100 | 85 | 85 | 75 | | 75 | 75 |
| 56 | sm. Cab-O-Sil | 3 | 100 | 100 | 100 | 100 | 100 | 100 | 100 | 92 | | 92 | 80* |
| 57 | None | 1 | 100 | 100 | 100 | 70 | 0 | | | | | | |
| 58 | None | 1 | 100 | 100 | 90 | 60 | 0 | | | | | | |

| Example Number | Finely Divided Inorganic Substance | Number of Coats | Months Immersed | | | | | | | | | |
|---|---|---|---|---|---|---|---|---|---|---|---|---|
| | | | 12 | 13 | 14 | 15 | 16 | 17 | 18 | 19 | 20 | 21 |
| 45 | lg. bentonite | 1 | | | | | | | | | | |
| 46 | lg. bentonite | 2 | 60* | 50* | 50* | | | | | | | |
| 47 | lg. bentonite | 3 | 80* | 60* | 60* | | | | | | | |
| 48 | sm. bentonite | 1 | | | | | | | | | | |
| 49 | sm. bentonite | 2 | | | | | | | | | | |
| 50 | sm. bentonite | 3 | 0** | | | | | | | | | |
| 51 | lg. Cab-O-Sil | 1 | | | | | | | | | | |
| 52 | lg. Cab-O-Sil | 2 | 84* | 74* | 74* | | | | | | | |
| 53 | lg. Cab-O-Sil | 3 | 85 | 85 | 85 | 60* | 50* | 30* | 0 | | | |
| 54 | sm. Cab-O-Sil | 1 | | | | | | | | | | |
| 55 | sm. Cab-O-Sil | 2 | 70* | 60* | 60* | | | | | | | |
| 56 | sm. Cab-O-Sil | 3 | 80* | 80* | 80* | 40* | 40* | 40* | 10 | 10* | 10* | 10* |
| 57 | None | 1 | | | | | | | | | | |
| 58 | None | 1 | | | | | | | | | | |

*Indicates peeling.
**Indicates coating loss.

EXAMPLES 59-62

After the four different batches of tributyltin chloride microcapsules prepared in Examples 3-16 above had been stored for four months, four marine paint compositions were prepared by mixing each of the batches with the vinyl rosin paint base at a concentration of about 14 percent by weight based on the total paint composition. A single coat of each of the four paint compositions was then brushed onto four sanded fiberglas panels and immersed in accordance with the procedure set forth in Examples 3-16 above. The percent overall performance at monthly intervals for these four panels is set forth below in Table VII:

TABLE VII

| Example Number | Finely Divided Inorganic Substance | Number of Coats | Months Immersed | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| 59 | lg. bentonite | 1 | 100 | 100 | 100 | | 100 | 100 | 100 | 100 | 100 | 100 | 100 |
| 60 | sm. bentonite | 1 | 100 | 100 | 100 | | 100 | 100 | 100 | 100 | 100 | 100 | 100 |
| 61 | lg. Cab-O-Sil | 1 | 100 | 100 | 100 | | 100 | 100 | 100 | 100 | 100 | 100 | 100 |
| 62 | sm. Cab-O-Sil | 1 | 100 | 100 | 100 | | 100 | 100 | 100 | 100 | 100 | 100 | 100 |

| Example Number | Finely Divided Inorganic Substance | Number of Coats | Months Immersed | | | | | | | | | |
|---|---|---|---|---|---|---|---|---|---|---|---|---|
| | | | 12 | 13 | 14 | 15 | 16 | 17 | 18 | 19 | 20 | 21 |
| 59 | lg. bentonite | 1 | 100 | 100 | 100 | 100 | 100 | 90 | 90 | 75 | 75 | 75 |
| 60 | sm. bentonite | 1 | 100 | 100 | 100 | 100 | 100 | 100 | 100 | 100 | 100 | 90 |
| 61 | lg. Cab-O-Sil | 1 | 100 | 100 | 100 | 94 | 94 | 93 | 93 | 85 | 85 | 85 |
| 62 | sm. Cab-O-Sil | 1 | 90 | 90 | 90 | 90 | 90 | 90 | 90 | 90 | 90 | 90 |

EXAMPLES 63-66

Microcapsules of tributyltin chloride having a size range of 1-10 μm prepared in accordance with the procedure of Example 1 except that the homogenizaton step was carried out at a higher speed were mixed with a boot top marine paint (#8223, Petit Paint Co., Inc., Belleville, N.J.). The microcapsules comprised 14 percent by weight of the total paint composition. A single coat of this paint was applied to one side of a sanded fiberglass panel and immersed pursuant to the procedures set forth in Examples 3-16 above (Example 63).

A second marine paint composition was prepared by mixing 14 percent by weight of these microcapsules, 6.9 percent by weight of liquid tributyltin chloride and 79.1 percent by weight of the boot top marine paint. A single coat of this paint was similarly applied to a sanded fiberglass panel and immersed (Example 64). Two control marine paints were also tested. The first control paint used was the boot top marine paint base without any antifoulant added. (Example 65). The second control was boot top marine paint containing liquid tributyltin chloride (Example 66). The tributyltin chloride comprised 6.9 percent by weight of the total paint composition. A single coat of each of the control paints was applied to one side of a sanded fiberglass panel. The two coated control panels were then immersed as set forth in Examples 3-16 above. The percent overall performance at monthly intervals for the four panels tested is set forth in Table VIII below:

TABLE VIII

| Example Number | Finely Divided Inorganic Substance | Number of Coats | Months Immersed | | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 |
| 63 | sm. Cab-O-Sil | 1 | 100 | 100 | 100 | | 100 | 100 | 90 | 90 | 85 | 85 | 85 | 80 | 75 | 75 | 75 | 70 |
| 64 | sm. Cab-O-Sil | 1 | 100 | 100 | 100 | | 100 | 100 | 100 | 100 | 93 | 93 | 93 | 90 | 90 | 90 | 90 | 85 |
| 65 | None | 1 | 50 | 0 | | | | | | | | | | | | | | |
| 66 | None | 1 | 75 | 70 | 65 | | 65 | 30 | 0 | | | | | | | | | | of liquid tributyltin chloride was applied to a fourth sanded fiberglass panel as the second control (Example 70). A single coat of the boot top marine paint used in Examples 63-66 was then applied over the four painted panels. After drying the four panels were immersed as described in Examples 3-16 above. The percent overall performance at monthly intervals for these four panels is set forth in Table IX below:

TABLE IX

| Example Number | Finely Divided Inorganic Substance | Number of Coats | Months Immersed | | | | | | | | | | | | | | | | |
|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 |
| 67 | sm. Cab-O-Sil | 1/1 | 100 | 100 | 100 | 100 | | 100 | 100 | 100 | 100 | 93 | 91 | 91 | 91 | 87 | 87 | 16 | 65 |
| 68 | sm. Cab-O-Sil | 1/1 | 100 | 100 | 100 | 100 | | 100 | 100 | 100 | 100 | 100 | 90 | 90 | 90 | 85 | 85 | 85 | 85 |
| 69 | None | 1/1 | 80 | 0 | | | | | | | | | | | | | | | |
| 70 | None | 1/1 | 95* | 90 | 90 | 90 | | 90 | 90 | 90 | 90 | 84* | 84* | 84* | 84* | 80 | 80 | 70 | 60 |

*Indicates blistering.

EXAMPLES 71-74

Since it did not appear from any of the previous examples that there was any difference among the four batches of tributyltin chloride microcapsules prepared in Examples 3-16 above, the third batch having a size range of 10-30 μm containing Cab-O-Sil was used in all subsequent examples.

A marine paint composition was prepared by mixing the vinyl rosin paint base with microcapsules of tributyltin chloride which had been stored dry for nine months. The microcapsules comprised about 14 percent by weight of the total paint composition. Two sanded fiberglass panels were each painted with two coats of this paint composition. One of these panels was additionally painted with a single coat of the boot top marine paint used in Examples 63-66 (Example 72). As controls, a third and fourth panel were each painted with two coats of a paint composition comprising the rosin vinyl base paint and 6.9 percent by weight of liquid tributyltin chloride based on the total paint composition. One of these panels was also painted with a single coat of the boot top marine paint (Example 74). These four panels were immersed as described in Examples 3-16 above and the percent overall performance at monthly intervals for each of them is set forth in Table X below:

EXAMPLES 67-70

A first batch of anti-fouling marine paint was made by adding microcapsules of tributyltin chloride prepared in Examples 63-66 above to the vinyl rosin paint base used in Examples 3-16 above in an amount equal to about 14 percent by weight based on the total weight of the composition. A single coat of this paint was applied to one side of a sanded fiberglass panel. (Example 67). A second batch was made which contained 14 percent by weight of the microcapsules and 6.9 percent by weight of liquid tributyltin chloride with the remainder being vinyl rosin base paint. A single coat of this paint was likewise applied to one side of a sanded fiberglass panel (Example 68). The vinyl rosin base paint was applied to another panel as first control paint (Example 69), and vinyl rosin base paint containing 6.9 percent by weight

TABLE X

| Example Number | Finely Divided Inorganic Substance | Number of Coats | Months Immersed | | | | | | | | |
|---|---|---|---|---|---|---|---|---|---|---|---|
| | | | 1 | 2 | 3 | 4 | 5 | 6 | 7 | 8 | 9 |
| 71 | lg. Cab-O-Sil | 2 | 100 | 100 | 100 | 100 | 100 | 100 | 100 | 100 | 100 |
| 72 | lg. Cab-O-Sil | 2/1 | 100 | 100 | 100 | 100 | 100 | 100 | 100 | 100 | 100 |
| 73 | None | 2 | 100 | 100 | 100 | 100 | 100 | 100 | 100 | 100 | 100 |
| 74 | None | 2/1 | 100 | 100 | 100 | 100 | 100 | 100 | 100 | 100 | 100 |

| Example Number | Finely Divided Inorganic Substance | Number of Coats | Months Immersed | | | | | | | |
|---|---|---|---|---|---|---|---|---|---|---|
| | | | 10 | 11 | 12 | 13 | 14 | 15 | 16 | 17 |
| 71 | lg. Cab-O-Sil | 2 | 100 | 100 | 100 | 100 | 100 | 100 | 100 | 100 |
| 72 | lg. Cab-O-Sil | 2/1 | 100 | 100 | 100 | 100 | 100 | 100 | 100 | 100 |

TABLE X-continued

| 73 | None | 2   | 100 | 100 | 100 | 100 | 100 | 100 | 100 | 80 |
| 74 | None | 2/1 | 100 | 90  | 80  | 75  | 60  | 55  | 55  | 55 |

EXAMPLES 75-86

A series of marine paint compositions were prepared and tested to investigate the stability of the microencapsulated anti-fouling agent. A batch of microcapsules of tributyltin chloride stored less than one week was mixed into the vinyl rosin base paint described in Examples 3-16 in an amount equal to about 14 percent by weight based on the total paint composition. Six sanded fiberglass panels were painted with this paint composition. Two of panels were painted with one coat, two were painted with two coats and two were painted with three coats. Three of the panels having one, two and three coats, respectively, were immersed as described in Examples 3-16 above (Examples 75-77) and the remaining three panels were additionally painted with a single coat of boot top marine paint and then immersed (Examples 78-80).

Four other sanded fiberglass panels were painted with a marine paint composition comprising the vinyl rosin paint base and about 14 percent by weight of microcapsules of tributyltin chloride based on the total composition (Examples 81-84). The marine paint composition containing the microcapsules had been stored for 11 months prior to application to the panels. One of the panels was painted with one coat, two were coated with two coats, and one was coated with three coats. One of the panels painted with two coats was additionally painted with a single coat of boot top marine paint over the other two coats (Example 84). These four panels were then immersed as described in Examples 3-16 above.

Another marine paint composition was prepared by mixing vinyl rosin base paint with about 14 percent by weight of microcapsules of tributyltin chloride based on the total composition. The microcapsules had been stored dry for 14 months prior to mixing into the paint. Two sanded fiberglass panels were each painted with two coats of this marine paint composition. One of these panels was additionally painted with a single coat of boot top marine paint (Example 86). These two panels were likewise immersed as described in Examples 3-16. The percent overall performance at monthly intervals for each of the twelve panels just described is set forth in Table XI below:

What is claimed is:

1. A process for microencapsulating a water-immiscible liquid comprising:
    (a) mixing about 0.9 to about 1.1 parts by weight of gelatin Type A, about 0.9 to about 1.1 parts by weight of gum acacia, and about 45 to about 47 parts by weight of water at a temperature of above about 50° C. to form a colloidal solution,
    (b) mixing about 3.9 to about 4.1 parts by volume of said water-immiscible liquid, about 7.6 to about 7.9 parts by volume of water and about 0.1 to about 10 percent of an emulsifying agent based on the combined weight of the water-immiscible liquid and the water at a temperature of above about 50° C.,
    (c) homogenizing the mixture prepared in step (b) to form a macroemulsion of the water-immiscible liquid, maintaining the emulsion at a temperature of above about 50° C. during the emulsification until the dispersed droplets of the water-immiscible liquid are of the desired size.
    (d) gradually mixing the emulsion of the water-immiscible liquid freshly prepared in step (c) with the colloidal solution of gelatin and gum acacia prepared in step (a) at a temperature of above about 50° C. and at a pH of about 4.5,
    (e) allowing the mixture of step (d) to cool so that the droplets of water-immiscible liquid are encapsulated by coalescing complex coacervate,
    (f) cooling the mixture to a temperature in the range of about 4° C. to about 10° C.,
    (g) washing sedimented microcapsules in cold water to remove the excess complex coacervate not used in the encapsulation of the water-immiscible chemical,
    (h) resuspending the microcapsules in cold water to a volume equal to at least about that in which the encapsulation occurred,
    (i) gradually adding a cold solution of a mono- or poly-valent cross-linking or fixing agent, until a final concentration of about 1 to 2 percent by volume is reached,
    (j) stirring for at least about 15 minutes at a temperature of about 4° C. to about 10° C., and maintaining the mixture at that temperature for at least about 4 hours to allow for the complete cross-linking of the gelatin-gum acacia capsule wall, wherein the encapsulated water-immiscible chemical is slowly

TABLE XI

| Example Number | Finely Divided Inorganic Substance | Number of Coats | Months Immersed ||||||||||
|---|---|---|---|---|---|---|---|---|---|---|---|---|
| | | | 1 | 2 | 3 | 4 | 5 | 6 | 7 | 8 | 9 | 10 | 11 |
| 75 | lg. Cab-O-Sil | 1   | 100 | 100 | 100 | 100 | 100 | 100 | 90  | 80  | 80  | 80  | 80 |
| 76 | lg. Cab-O-Sil | 2   | 100 | 100 | 100 | 100 | 100 | 100 | 100 | 100 | 100 | 100 | 100 |
| 77 | lg. Cab-O-Sil | 3   | 100 | 100 | 100 | 100 | 100 | 100 | 100 | 100 | 100 | 100 | 100 |
| 78 | lg. Cab-O-Sil | 1/1 | 100 | 100 | 100 | 100 | 100 | 100 | 100 | 100 | 100 | 100 | 82 |
| 79 | lg. Cab-O-Sil | 2/1 | 100 | 100 | 100 | 100 | 100 | 100 | 100 | 100 | 100 | 100 | 100 |
| 80 | lg. Cab-O-Sil | 3/1 | 100 | 100 | 100 | 100 | 100 | 100 | 100 | 100 | 100 | 100 | 100 |
| 81 | lg. Cab-O-Sil | 1   | 100 | 100 | 100 | 100 | 100 | 100 | 94  | 94  | 89  | 89  | 80 |
| 82 | lg. Cab-O-Sil | 2   | 100 | 100 | 100 | 100 | 100 | 100 | 100 | 100 | 100 | 100 | 100 |
| 83 | lg. Cab-O-Sil | 3   | 100 | 100 | 100 | 100 | 100 | 100 | 100 | 100 | 100 | 100 | 100 |
| 84 | lg. Cab-O-Sil | 2/1 | 100 | 100 | 100 | 100 | 100 | 100 | 100 | 100 | 100 | 100 | 100 |
| 85 | lg. Cab-O-Sil | 2   | 100 | 100 | 100 | 100 | 100 | 100 | 100 | 100 | 100 | 100 | 100 |
| 86 | lg. Cab-O-Sil | 2/1 | 100 | 100 | 100 | 100 | 100 | 100 | 100 | 92  | 92  | 92  | 92 | mixed in steps (e), (f), (i) and (j) to prevent the nascent capsules from adhering to one another, (k) washing the fixed capsules in water to remove the fixative, (l) separating the microcapsules from the water at room temperature, and (m) drying the separated microcapsules.

2. The process of claim 1 wherein the emulsifying agent is a finely divided inorganic substance.

3. The process of claim 1 wherein steps (a), (b), (c) and (d) are performed at a temperature in the range of about 55° C. to about 60° C.

4. The process of claim 1 wherein the water-immiscible liquid is an anti-fouling agent.

5. The process of claim 4 wherein the anti-fouling agent is an organometallic compound.

6. The process of claim 5 wherein the anti-fouling agent is tributyltin chloride.

7. A process for microencapsulating a water-immiscible solid comprising:

(a) mixing about 0.9 to about 1.1 parts by weight of gelatin Type A, about 0.9 to about 1.1 parts by weight of gum acacis, and about 45 to about 47 parts by weight of water at a temperature of about 55° C. to about 60° C. to form a colloidal solution, (b) mixing about 0.9 to about 1.1 parts by weight of said water-immiscible solid and about 4 to about 5 parts by weight of water with a dispersing agent if necessary to form a slurry, (c) gently stirring the mixture prepared in step (b) to form a slurry, (d) gradually mixing the slurry of the water-immiscible solid freshly prepared in step (c) at a temperature of above about 50° C. with the colloidal solution of gelatin and gum acacia prepared in step (a) at a temperature of above about 50° C. and at a pH of about 4.5, (e) allowing the mixture of step (d) to cool so that the particles of water-immiscible solid are encapsulated by coalescing complex coacervate, (f) cooling the mixture to a temperature in the range of about 4° C. to about 10° C., (g) washing sedimented microcapsules in cold water to remove the excess complex coacervate not used in the encapsulation of the water-immiscible chemical, (h) resuspending the microcapsules in cold water to a volume equal to at least about that in which the encapsulation occurred, (i) gradually adding a cold solution of a mono- or poly-valent cross-linking or fixing agent, until a final concentration of about 1 to about 2 percent by volume is reached, (j) stirring for at least about 15 minutes at a temperature of about 4° C. to about 10° C., and maintaining the mixture at that temperature for at least about 4 hours to allow for the complete cross-linking of the gelatin-gum acacia capsule wall, wherein the encapsulated water-immisicble chemical is slowly mixed in steps (e), (f), (i) and (j) to prevent the nascent capsules from adhering to one another, (k) washing the fixed capsules to remove the fixative, (l) separating the microcapsules from the water at room temperature, and (m) drying the microcapsules.

8. Process of claim 7 wherein steps (a) and (d) are performed at a temperature in the range of about 55° C. to about 60° C.

9. The process of claim 7 wherein the water-immiscible solid is an anti-fouling agent.

10. The process of claim 9 whrein the anti-fouling agent is an organometallic compound.

11. The process of claim 10 wherein the anti-fouling agent is tributyltin fluoride.

12. In an anti-fouling marine paint comprising at least about 50 percent by weight of a marine ship bottom paint, the improvement comprising, dispersed in said paint, microcapsules comprising a water-immiscible, liquid anti-fouling agent encapsulated with a cross-linked complex coacervate of gelatine Type A and gum acacia.

13. The anti-fouling marine paint of claim 12 further comprising at least one additional anti-fouling agent dispersed in said paint.

14. The anti-fouling marine paint of claims 12 or 13 wherein the encapsulated anti-fouling agent is tributyltin chloride.

* * * * *

UNITED STATES PATENT OFFICE
CERTIFICATE OF CORRECTION

Patent No. 4,253,877          Dated       March 3, 1981

Inventor(s) John B. Miale, August Miale, Jr., Raymond P. Porter

It is certified that error appears in the above-identified patent and that said Letters Patent are hereby corrected as shown below:

Col. 3, line 43, "Those" should be --These--

Col. 4, line 45, "ant-fouling" should be --anti-fouling--

Col. 8, line 50, "present" should be --percent--

In columns 13 and 14, Table IX, opposite Example No. 67, the figure for 16 months appears as "16", but should be --80--

In claim 7, col. 17, line 23, the word "acesis" should be --acacia--.

Signed and Sealed this

*Twenty-fifth* Day of *August 1981*

[SEAL]

*Attest:*

GERALD J. MOSSINGHOFF

*Attesting Officer*       *Commissioner of Patents and Trademarks*